US011012454B1

(12) United States Patent
Han et al.

(10) Patent No.: US 11,012,454 B1
(45) Date of Patent: May 18, 2021

(54) DETECTING ABNORMAL USER BEHAVIOR VIA TEMPORALLY REGULARIZED TENSOR FACTORIZATION

(71) Applicant: SYMANTEC CORPORATION, Mountain View, CA (US)

(72) Inventors: Yufei Han, Antibes (FR); Xiaolin Wang, San Jose, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 342 days.

(21) Appl. No.: 16/230,703

(22) Filed: Dec. 21, 2018

(51) Int. Cl.
*H04L 29/06* (2006.01)
*G06F 8/61* (2018.01)

(52) U.S. Cl.
CPC ............ *H04L 63/1425* (2013.01); *G06F 8/61* (2013.01); *H04L 63/1441* (2013.01)

(58) Field of Classification Search
CPC . H04L 63/1425; H04L 63/1441; H04L 29/06; G06F 8/61
See application file for complete search history.

(56) References Cited

U.S. PATENT DOCUMENTS

2015/0013005 A1* 1/2015 Yamada .............. H04L 63/1416 726/22
2017/0244745 A1* 8/2017 Key .................... H04L 63/1441

OTHER PUBLICATIONS

Miao Zhang and Chris Ding; "Robust Tucker Tensor Decomposition for Effective Image Representation", ICCV 2013; 8 pages.
Donald Goldfarb and Zhiwei Qin; "Robust Low-Rank Tensor Recovery: Models and Algorithms"; SIAM Journal of Matrix Analysis and Application; 2013; 25 pages.
Pan Zhou and Jiashi Feng; Outlier-Robust Tensor PCA; CVPR 2017; 9 pages.
Huachun Tan, Jianshuai Feng, Guangdong Feng, Wuhong Wang and Yu-Jin Zhang; "Traffic Volume Data Outlier Recovery via Tensor Model"; Mathematical Problems in Engineering; vol. 2013; 9 pages.
Rose Yu, Guangyu Li and Yan Liu; "Tensor Regression Meets Gaussian Process"; arXiv:1710.11345v1; Oct. 31, 2017; 17 pages.
Amit Surana, Geoff Patterson and Indika Rajapakse, Dynamic tensor time series modeling and analysis, IEEE CDC 2016.

* cited by examiner

*Primary Examiner* — Khoi V Le
(74) *Attorney, Agent, or Firm* — Maschoff Brennan

(57) ABSTRACT

Detecting abnormal user behavior via temporally regularized tensor factorization. A method may include obtaining behavioral data of a plurality of users of cloud services to establish a first behavioral baseline; obtaining behavioral data for a particular user of the plurality of users to establish a second behavioral baseline; determining a first variation of behavior between the second and first behavioral baseline to determine an expected behavior; creating a tensor model for a succession of pre-determined time periods comprising multiple three-dimensional tensors; determining a temporal dependence between the multiple three-dimensional tensors; determining a temporal smoothness between the multiple three-dimensional tensors; predicting a future variation in behavior of the particular user based on a combination of the temporal dependence and the temporal smoothness, where the future variation in behavior indicates a potential security threat; and performing a remedial security action on a client device based on the predicted future variation in behavior.

20 Claims, 4 Drawing Sheets

US 11,012,454 B1

DETECTING ABNORMAL USER BEHAVIOR VIA TEMPORALLY REGULARIZED TENSOR FACTORIZATION

BACKGROUND

Cloud access security brokers (CASB) may implement a cloud-based security policy between cloud service clients and cloud service providers to facilitate security policies as clients use cloud-based resources. CASB policies may enable threat protection to anticipate security threats in the cloud and subsequently protect a client's enterprise. In some cases, threat protection and predictions may include analyzing user behavior in the context of one or more cloud applications.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for detecting abnormal user behavior via temporally regularized tensor factorization may be performed by a client device including one or more processors. The method may include establishing a first behavioral baseline corresponding to behavioral data of a plurality of users of cloud services; establishing a second behavioral baseline corresponding to behavioral data for a particular user of the plurality of users; determining an expected behavior by determining a first variation of behavior between the second behavioral baseline and the first behavioral baseline; creating a tensor model for a succession of pre-determined time periods using the behavioral data of the plurality of users, the tensor model comprising multiple three-dimensional tensors; determining a temporal dependence between the multiple three-dimensional tensors; determining a temporal smoothness between the multiple three-dimensional tensors; predicting a future variation in behavior of the particular user based on a combination of the temporal dependence, the temporal smoothness, and the expected behavior, where the future variation in behavior indicates a potential security threat; and performing a remedial security action on a client device associated with the particular user based on the predicted future variation in behavior.

In some embodiments performing the remedial security action may include sending a notification to the client device; removing a malicious computer application from the client device; quarantining the malicious computer application on the client device; blocking the client device from a computer network; blocking the particular user from accessing the client device; automatically installing security software on the client device to prevent the malicious computer application from executing; or a combination thereof.

In some embodiments, the method may include assigning a risk score to the particular user based on predicting the future variation in behavior.

In some embodiments, the method may include prioritizing a plurality of risk scores based on a level of the potential security threat; and performing the remedial security action on a pre-determined number of client devices associated with users satisfying a pre-determined number of the prioritized risk scores.

In some embodiments, creating the tensor may include creating a three-dimensional tensor comprising a first dimension equal to a number of users of the plurality of users, a second dimension equal to a second pre-determined time step within the first pre-determined time period, and a third dimension equal to a number of operations performed by each of the number of users of the plurality of users.

In some embodiments, establishing the first behavioral baseline and the second behavior baseline may include obtaining behavioral data over the first pre-determined time period.

In some embodiments, establishing the first behavioral baseline and second behavioral baseline may include determining a pattern of regular behavior.

In some embodiments, determining the first variation of behavior may include determining that a second variation of behavior of the particular user is within a predetermined acceptable range.

In some embodiments, a computer device may include a processor, a memory in electronic communication with the processor, and instructions stored in the memory, with the instructions being executable by the processor to perform a method for detecting abnormal user behavior via temporally regularized tensor factorization.

In some embodiments, one or more non-transitory computer-readable media may include one or more computer-readable instructions that, when executed by one or more computing devices, cause the one or more computing devices to perform a method for detecting abnormal user behavior via temporally regularized tensor factorization.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

In some embodiments, cloud access security brokers (CASB) may facilitate cloud-based security policies between cloud service clients and cloud service providers to facilitate security policies as clients use cloud-based resources. CASB policies may enable threat protection, which may include applying science-based user-behavior analytics (UBA) to anticipate security threats in the cloud and subsequently protect a client's enterprise. In some embodiment, threat protections and predictions may include, but are not limited to, detecting suspicious, abnormal, or anomalous user behavior in the context of one or more cloud applications (e.g., Google Drive, Microsoft Outlook Box, Salesforce). By detecting abnormal user behavior, it is possible to identify actual or potentially compromised users or malicious insiders of the enterprise.

In some embodiments, the early stage detection of abnormal behaviors may enable the prediction of future potential attacks. Remedial actions may include, but are not limited to, informing enterprises that there is a potentially malicious insider or a compromised user in order to enable prevention and mitigation of security threats including, for example, data exfiltration. In some embodiments, detection of abnormal behavior may enable an administrator of the enterprise to set up alarms which may inform a user to take actions to prevent malicious attacks. Furthermore, in some embodiments, abnormal behavior may be benign, and may be indicative to behavioral drift, as opposed to abnormal usage due to malicious abuse of computer devices, where behavioral drift may be described as falling into a set of behavioral patterns. The systems and methods described herein, therefore, may detect abnormal behaviors, which may be indicative of malicious actions, and may prevent or mitigate damage to the enterprise.

Figure 1:
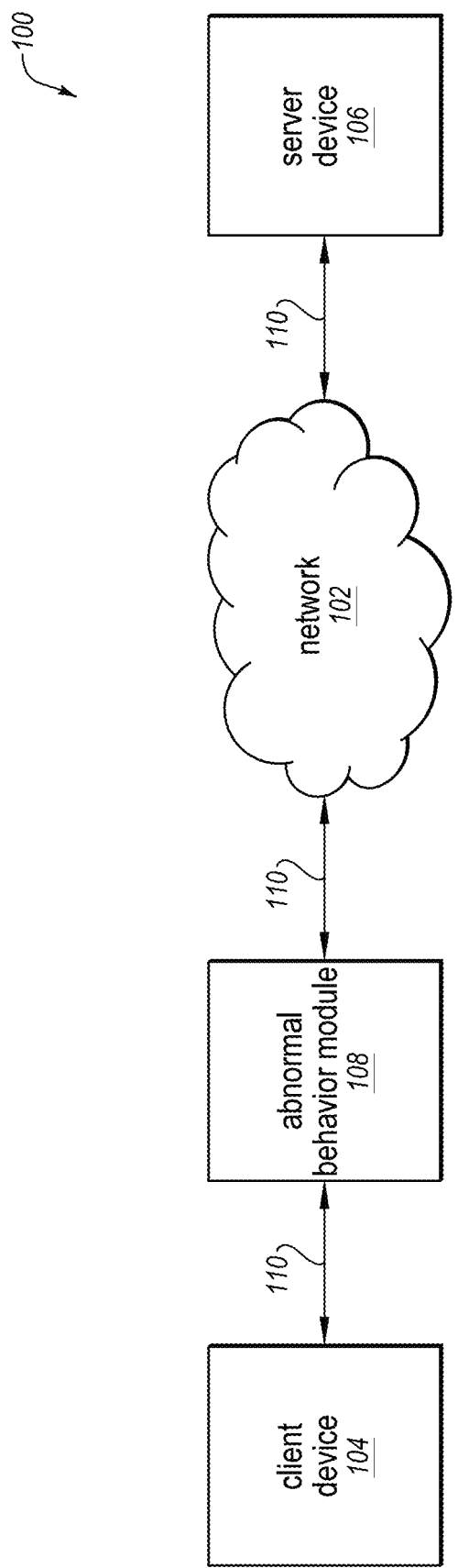
FIG. 1 illustrates an example system configured for detecting abnormal user behavior via temporally regularized tensor factorization.

Turning to the figures, FIG. 1 illustrates an example system 100 configured for detecting abnormal user behavior via temporally regularized tensor factorization. The system 100 may include a network 102, a client device 104, an abnormal behavior module 108, and a server device 106. In some embodiments, the abnormal behavior module 108 may execute on a standalone device that communicates with the client device 104 and/or the server device 106. In an alternative or additional embodiment, the abnormal behavior module 108 may be part of the client device 104 and/or the server device 106.

In some embodiments, the network 102 may be configured to communicatively couple the client device 104 and the server device 106, and in some embodiments, the abnormal behavior module 108. In some embodiments, the network 102 may be any wired or wireless network, or combination of multiple networks, configured to send and receive communications between systems and devices by way of example communication links 110. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
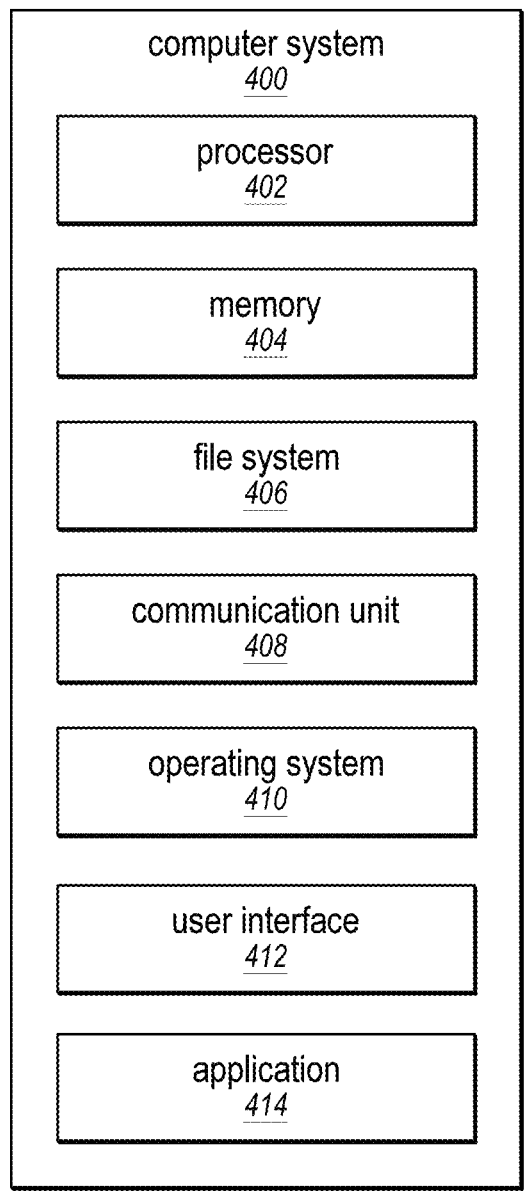
FIG. 4 illustrates an example computer system that may be employed in detecting abnormal user behavior via temporally regularized tensor factorization.

In some embodiments, the client device 104 may be a computer system capable of communicating over the network 102 and capable of, at least, detecting abnormal user behavior via temporally regularized tensor factorization, examples of which are disclosed herein in connection with the computer system 400 of FIG. 4. In some embodiments, the client device 104 may be a computer device, such as a smartphone, desktop computer, laptop computer, control system, tablet, computer wearable device, etc.

In some embodiments, the server device 106 may be any computer system capable of communicating over the network 102 with client device 104. In some embodiments, the server device 106 may communicate with the client device 104 through communications with abnormal behavior module 108. Examples of the server device 106 are disclosed herein in connection with the computer system 400 of FIG. 4.

In some embodiments, the abnormal behavior module 108 may be implemented in conjunction with any threat based security application or cloud access security broker (CASB) such as, but not limited to, Symantec's CloudSOC CASB technology.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Further, it is understood that the communication links 110 between the components illustrated in FIG. 1 (illustrated as left-right arrows) may be part of the network 102 or another network.

In one embodiment, abnormal behavior module 108 may facilitate execution of an unsupervised algorithm to detect anomalies and patterns of behavior for cloud users. In some embodiments, each cloud user may be one of a plurality of cloud users within an enterprise. Attackers' behavior may be constantly changing and evolving, and thus the detection of abnormal behavior may be indicative of a potential security threat. Thus, in some embodiments, abnormal behavior module 108 may use a mathematical tensor model to at least (1) differentiate normal user behavior (including variations of normal user behavior or behavioral drift) from abnormal, truly malicious behavior, and (2) determine a risk score for each user, where the risk score may be used to rank the abnormal behavior of each user.

In one embodiment, abnormal behavior module 108 may execute an algorithm which achieves two actions in parallel: determine abnormal usage behaviors that deviate from normal behavior profiles, and trace the temporal drift of the abnormal usage behaviors and model the patterns of the normal variation of the usage profiles.

Cloud services may provide a platform for a user to exhibit any number of behaviors or take any number of actions. For example, a user using a cloud based photo sharing service may clean up their photo stream by deleting five to ten photos at the end of the a day. In another example, a user may utilize a work suite cloud application such as Google Docs, and may participate in data entry throughout a regular work day, including downloading files throughout the day. A user's natural behavior may exhibit a similar pattern over time. Similarly, a user may have a similar role to a previous user, and thus, the expected behavior may be a function of the pattern of a similarly situated previous user. Over a period of time, such as days within a month, a user's behaviors may be expected to follow a similar pattern from hour-to-hour or day-to-day. Thus, over a series of time step (hour-to-hour, day-to-day) a user's behavioral patterns normally do not show a dramatic change over a series of time steps.

It is expected, however, that a user will not have exactly the same behavior, in exactly the same sequence from time step to time step, and thus there may be a temporal dependence between time steps, with an allowance for some amount of change for user behaviors within a time window over a number of time steps. For example, a user that normally takes two photographs every hour during the day and for which are automatically uploaded to a cloud photo storage site, may take ten photographs an hour while on vacation. Similarly, a user may delete a file every hour normally, but may delete many files at the end of the day as he or she is organizing the day's work. Such "abnormal" behaviors may be expected and may not be dramatic enough to be considered a security threat.

Truly abnormal user behaviors, however, may be indicative of a security threat. For example, if a user at the client device 104 downloaded 100 photographs stored on a cloud photo storage site to the client device 104 within a single time step (e.g., an hour), or if 100 files were deleted or manipulated over the single time step, the behavior may more likely than not be abnormal behavior due to a potential security threat.

As stated previously, the abnormal behavior module 108 may determine a behavioral drift of a user. If a computing device is compromised by an outsider or/and insider, the operations conducted by a user (i.e., user behaviors) will fall into unexpected and abnormal behavior patterns, thus, the abnormal behavior module 108 may differentiate normal behavior from unexpected abnormal behavior patterns.

Thus, abnormal behavior module 108 may create a global detection model of all of the users of an enterprise (e.g., 10,000s of users in some cases). The global detection model provides a general baseline of user behavior as a whole within an enterprise in order to determine normal and expected behaviors and differentiate what would be considered abnormal behavior. In some embodiments, the global detection model may provide a general baseline for every individual user associated with an enterprise. In an alternative or additional embodiment, the global detection module may provide a general baseline for subgroups of users within an enterprise, where subgroups may have different normal behavioral patterns. For example, a legal group within an enterprise may have different normal behavioral patterns from a sales group.

At the same time a global detection model is created, abnormal behavior module 108 may create an individual behavior model in order to gain granularity from the global detection model. The individual behavior model may be based on a single user (of a subgroup or of the entire enterprise), or may be for a subgroup of the enterprise.

The individual behavior model is used to assign an abnormal behavior risk score to each individual user (or subgroup of users) where the risk score may be a probabilistic score indicative of how abnormal the individual's behaviors are on a sliding scale (non-binary). The risk score then used to rank the abnormal behaviors of the user to prioritize potential security threats. Risk scores and rankings may then be used to identify and prioritize users and devices having the highest security threats, where users and devices determined to have the greatest security threats are subject to remedial actions. Remedial actions may include, but are not limited to, notifications and instructions sent to the user, the device, an administrator, etc. for performance of a remedial action. Performing the remedial action may include, for example, removing a malicious computer application from the computing environment or quarantining the malicious computer application in a computing environment, blocking a user and/or a device from the network 102, blocking the user from the client device 104 itself, automatically installing security software, performed to prevent the malicious computer application from executing in a computing environment, including executing on an operating system of a network device, such as client device 104, etc.

Differentiating normal user behavior from abnormal, truly malicious behavior, determining a risk score and ranking may be enabled by the user of a tensor model is described with reference to FIG. 2.

Figure 2:
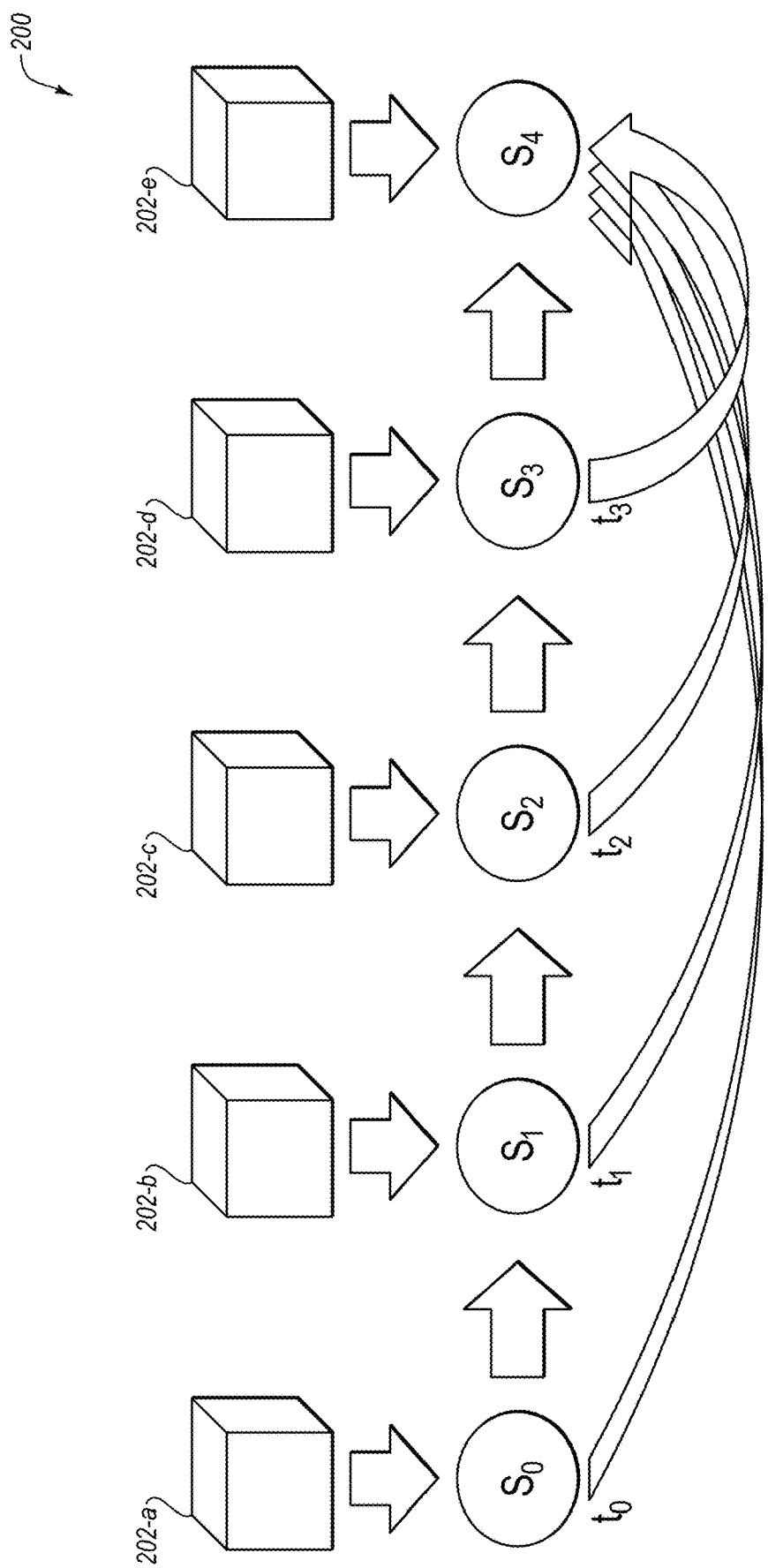
FIG. 2 illustrates an example tensor model for detecting abnormal user behavior via temporally regularized tensor factorization.

FIG. 2 illustrates an example tensor model 200 for detecting abnormal user behavior via temporally regularized tensor factorization. In some embodiments, a tensor model may be a mathematical model compiling and linking information about a users' behaviors, operations, actions, etc. and differentiating temporal drifting of normal behavior from abnormal behavior. Thus, the example tensor model 200 may use temporal regularization in order to track normal user behaviors and identify abnormal usage patterns using temporal correlation (i.e., over a time frame).

In one embodiment, tensor model 200 may be a latent variable dynamic model employing a Gaussian process. More specifically, tensor model 200 shows an example number of three-dimensional tensors 202-a, b, c, d, and e. Each tensor 202-a, b, c, d, and e may represent a three-dimensional relationship where all of the operations (e.g., behaviors) conducted by a user over a series of time steps (e.g., a day $t_n$) over a series of time windows (e.g., a month) are monitored and analyzed. For example, in tensor 202-a, the first dimension may represent a number of users, the second dimension may represent a number of time steps within the time window, and the third dimension may represent a number of operations per user.

In one embodiment, tensor model 200 may be created using behavioral data gathered with respect to a plurality of users, as well as with respect to an individual user. In one example, a database may store the behavioral data of all of the cloud users of an enterprise. In an alternative or additional embodiment, the database may store the behavioral data of subsets of the cloud users of an enterprise. In an alternative or additional embodiment, the database may store the behavioral data of each of the users of an enterprise. Thus, the tensor model 200 may obtain data from a database related to, for example, the number of users (e.g., overall, in subsets, individually), the number and type of operations and behaviors carried out by each of the users or a group of the users, and the time stamps of each operation.

The tensor model 200 may project each tensor 202-a, b, c, d, and e to a low-dimensional latent variable $S_t$. Further, the tensor model 200 may construct a temporal dependence regulation function between successive time steps, where future user behavior is predictable based on precedent observation, and where some amount of variation in user behavior from each time step to the next time step is assumed. For example, $S_4=F(S_0, S_1, S_2, S_3)$, where the temporal dependence regulation function assumes that between each successive time step there is some change in behavior which is not drastic enough to be considered abnormal (e.g., different stages of an assignment or project).

Furthermore, it is expected that user behavioral drift is smooth (does not have drastic variation) at successive time steps $t_0, t_1, t_2$, etc. which may be represented by a temporal smoothness regularization term: $|S_t-S_{t-1}|^2$.

Given the combination temporal dependence regulation and the temporal smoothness, normal behavior changes may be tracked and abnormal behaviors determined. The tensor model 200, therefore, may model the average and variance of the normal dynamic patterns of drifting of normal behavioral profiles to determine abnormalities.

In one embodiment, the tensor model 200 may produce a Bayesian interference over the temporal dynamic of the user behavioral data. In an additional or alternative embodiment, the tensor model 200 may model the variance range of normal user behaviors within Gaussian distribution assumptions in order to detect abnormal activity, where the abnormal activity may be presented as user behavioral data having a large deviation from a normal pattern. Given the observation and analysis of observed user behavior and a predicted future behavior determined using tensor model 200 of FIG. 2, the abnormal behavior module 108 may thus apply a statistical test to determine the likelihood of an individual user's future behavior based on the predicted behavior. In one embodiment, a statistical distribution may be associated with a confidence level that a behavior falls within a normal behavior range. If a behavior is determined to fall outside of a pre-determined confidence level, a probability that the behavior is abnormal may be determined. For example, if a distribution is produced having a long tail, and the observed behavior falls within the long tail, then there is a large distance between the predicted behavior (e.g., median value or within a median confidence range) and observed behavior. The large distance may thus indicate a higher probability of an abnormal behavior. Thus, the combination of a distribution and a confidence interval may be used to determine the probability of the decision of the output of the tensor model 200.

Once the probability of abnormal behaviors is determined, each user may be assigned a risk score on a sliding scale based on the determination of and predication of abnormal behavior. In other words, the abnormal behavior may not simply be considered as "abnormal" or "not abnormal," but rather may be considered on a scale of abnormality. For example, for each user, based on the anomalies detected, the user may be assigned a risk score between 99 and 0, where a score of 99 indicates extremely abnormal behavior and likely indicative of a security threat and 0 indicates normal, habitual behavior.

Each user, based on risk scores, may then be ranked, where a pre-determined number of x users who present the highest detection of and probability of future abnormal behavior may be determined dynamically and/or real time. The users determined to be the biggest security threat may then be subject to remedial actions. By ranking the users on a scale, as opposed to a binary decision, there may be fewer false alarms.

Figure 3:
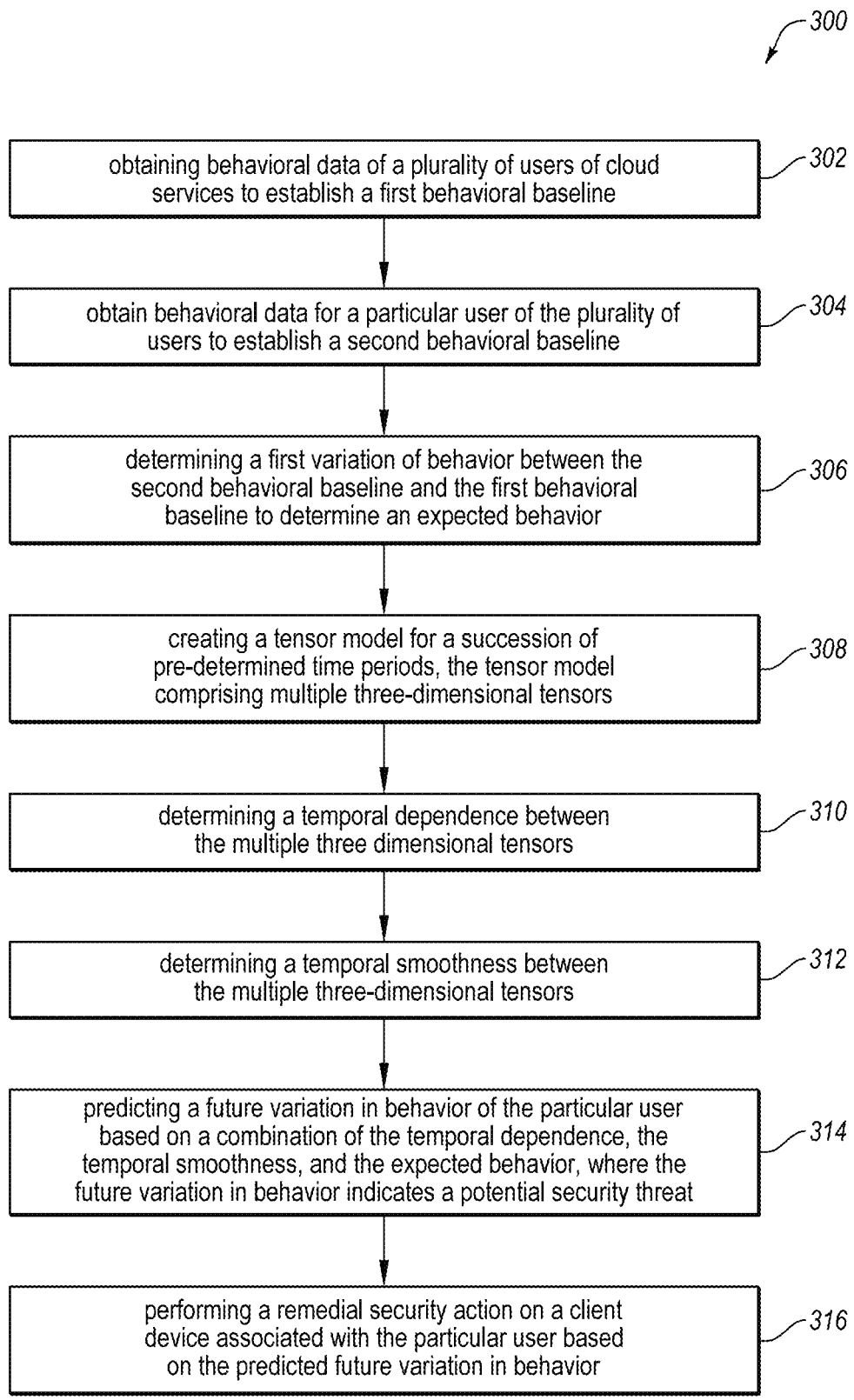
FIG. 3 illustrates an example method for detecting abnormal user behavior via temporally regularized tensor factorization.

FIG. 3 illustrates an example method 300 for detecting abnormal user behavior via temporally regularized tensor factorization. The method 300 may be performed, in some embodiments, by a device or system, such as by the client device 104, the server device 106, and/or the abnormal behavior module 108, operating independently or on one of the other described devices. In these and other embodiments, the method 300 may be performed by one or more processors based on one or more computer-readable instructions stored on one or more non-transitory computer-readable media. The method 300 will now be described in connection with FIGS. 1-3.

Method 300 may include, at action 302, establishing a first behavioral baseline corresponding to behavioral data of a plurality of users of cloud services. For example, a database of users associated with an enterprise may be monitored to determine and obtain a global baseline of normal behaviors, including behavioral operations made on client device 104.

Method 300 may include, at action 304, establishing a second behavioral baseline corresponding to behavioral data for a particular user of the plurality of users. For example, an individualized baseline for a user associated with client device 104 may be determined, based on the user's own personal behaviors.

Method 300 may include, at action 306, determining an expected behavior by determining a first variation of behavior between the second behavioral baseline and the first behavioral baseline. For example, the normal behaviors of the user associated with client device 104 may be compared to the global baseline to determine expected normal behaviors.

Method 300 may include, at action 308, creating a tensor model for a succession of pre-determined time periods using the behavioral data of the plurality of users, the tensor model comprising multiple three-dimensional tensors. For example, a three-dimensional tensor model based on a number of users (i.e., a number of the plurality of users considered for the global baseline), a number of successive time stamps (e.g., thirty days over the course of a month), and a number of operations per each user of the number of users may be created.

Method 300 may include, at action 310, determining a temporal dependence between the multiple three-dimensional tensors. For example, the temporal dependence of behaviors from each time step to time step may be determined, where behaviors may be based on an accumulation of previously observed behaviors of the plurality of users.

Method 300 may include, at action 312, determining a temporal smoothness between the multiple three-dimensional tensors. For example, a temporal smoothness may be based on determining that the variation in normal behaviors for each of the users of the plurality of users for each successive time step may not be drastic enough to be considered an abnormal behavior.

Method 300 may include, at action 314, predicting a future variation in behavior of the particular user based on a combination of the temporal dependence, the temporal smoothness, and the expected behavior, where the future variation in behavior indicates a potential security threat. For example, a behavior determined to be an exception to the assumption of temporal dependence, temporal smoothness, and an expected behavior determined by variation from the baselines may determine a security threat based on the anomaly.

Method 300 may include, at action 316, performing a remedial security action on a client device associated with the particular user based on the predicted future variation in behavior. For example, a remedial action may include sending a notification to the client device 104 from the server device 106; removing a malicious computer application from the client device 104; quarantining the malicious computer application; blocking a user and/or the client device 104 from the network 102; blocking the user from accessing the client device 104 or the network 102; automatically installing security software on the client device 104 to prevent the malicious computer application from executing, or a combination thereof.

Although the actions of the method 300 are illustrated in FIG. 3 as discrete actions, various actions may be divided into additional actions, combined into fewer actions, reordered, expanded, or eliminated, depending on the desired implementation. Further, it is understood that the method 300 may improve the functioning of a computer system itself. For example, the functioning of the abnormal behavior module 108 may improve the field of malware detection, which in turn may improve the functioning of a computer network and computer applications. Furthermore, the embodiments described here improves the use of the way a computer system works by determining abnormal behavior indicative of security threat at an early stage which enables early remedial actions or responses.

FIG. 4 illustrates an example computer system that may be employed in detecting abnormal user behavior via temporally regularized tensor factorization. In some embodiments, the computer system 400 may be part of any of the systems or devices described in this disclosure. For example, the computer system 400 may be part of any of the client device 104, the server device 106, and/or the abnormal behavior module 108 of FIG. 1.

The computer system 400 may include a processor 402, a memory 404, a file system 406, a communication unit 408, an operating system 410, a user interface 412, and a module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the method 300 of FIG. 3. These computer-executable instructions may be included, for example, in the operating system 410, in one or more applications, such as the abnormal behavior module 108 of FIG. 1, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The module 414 may be one or more computer-readable instructions stored on one or more non-transitory computer-readable media, such as the memory 404 or the file system 406, that, when executed by the processor 402, is configured to perform one or more of the actions of the method 300 of FIG. 3. In some embodiments, the module 414 may be part of the operating system 410 or may be part of an application of the computer system 400, or may be some combination thereof. In some embodiments, the module 414 may function as the abnormal behavior module 108 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for detecting abnormal user behavior via temporally regularized tensor factorization, at least a portion of the method being performed by a computer device comprising one or more processors, the method comprising:
    establishing a first behavioral baseline corresponding to behavioral data of a plurality of users of cloud services;
    establishing a second behavioral baseline corresponding to behavioral data for a particular user of the plurality of users;
    determining an expected behavior by determining a first variation of behavior between the second behavioral baseline and the first behavioral baseline;
    creating a tensor model for a succession of pre-determined time periods using the behavioral data of the plurality of users, the tensor model comprising multiple three-dimensional tensors;
    determining a temporal dependence between the multiple three-dimensional tensors, the temporal dependence based on variation of behavior between the succession of pre-determined time periods from previously observed behavior;
    determining a temporal smoothness between the multiple three-dimensional tensors, the temporal smoothness based on behavioral drift in behavior between the succession of pre-determined time periods;
    predicting a future variation in behavior of the particular user based on a combination of the temporal dependence, the temporal smoothness, and the expected behavior, where the future variation in behavior indicates a potential security threat; and
    performing a remedial security action on a client device associated with the particular user based on the predicted future variation in behavior.

2. The method of claim 1, wherein performing the remedial security action further comprises:
    sending a notification to the client device;
    removing a malicious computer application from the client device;
    quarantining the malicious computer application on the client device;
    blocking the client device from a computer network;
    blocking the particular user from accessing the client device;
    automatically installing security software on the client device to prevent the malicious computer application from executing;
    or a combination thereof.

3. The method of claim 1, further comprising:
    assigning a risk score to the particular user based on predicting the future variation in behavior.

4. The method of claim 3, further comprising:
prioritizing a plurality of risk scores based on a level of the potential security threat, wherein performing the remedial security action further comprises performing the remedial security action on a pre-determined number of client devices associated with users satisfying a pre-determined number of the prioritized risk scores.

5. The method of claim 1, wherein creating the tensor model further comprises:
creating a three-dimensional tensor comprising a first dimension equal to a number of users of the plurality of users, a second dimension equal to a second pre-determined time step within the first pre-determined time period, and a third dimension equal to a number of operations performed by each of the number of users of the plurality of users.

6. The method of claim 1, wherein establishing the first behavioral baseline further comprises:
obtaining behavioral data over the first pre-determined time period.

7. The method of claim 1, wherein establishing the second behavioral baseline further comprises:
obtaining behavioral data over the first pre-determined time period.

8. The method of claim 1, wherein establishing the first behavioral baseline and the second behavioral baseline further comprises:
determining a pattern of regular behavior.

9. The method of claim 1, wherein determining the expected behavior further comprises:
determining that a second variation of behavior of the particular user is within a predetermined acceptable range.

10. One or more non-transitory computer-readable media comprising one or more computer readable instructions that, when executed by one or more processors of a computing device, cause the computing device to perform a method for detecting abnormal behavior via temporally regularized tensor factorization, the method comprising:
establishing a first behavioral baseline corresponding to behavioral data of a plurality of users of cloud services;
establishing a second behavioral baseline corresponding to behavioral data for a particular user of the plurality of users;
determining an expected behavior by determining a first variation of behavior between the second behavioral baseline and the first behavioral baseline;
creating a tensor model for a succession of pre-determined time periods using the behavioral data of the plurality of users, the tensor model comprising multiple three-dimensional tensors;
determining a temporal dependence between the multiple three-dimensional tensors, the temporal dependence based on variation of behavior between the succession of pre-determined time periods from previously observed behavior;
determining a temporal smoothness between the multiple three-dimensional tensors, the temporal smoothness based on behavioral drift in behavior between the succession of pre-determined time periods;
predicting a future variation in behavior of the particular user based on a combination of the temporal dependence, the temporal smoothness, and the expected behavior, where the future variation in behavior indicates a potential security threat; and
performing a remedial security action on a client device associated with the particular user based on the predicted future variation in behavior.

11. The one or more non-transitory computer-readable media of claim 10, wherein performing the remedial security action further comprises:
sending a notification to the computer device;
removing a malicious computer application from the client device;
quarantining the malicious computer application on the client device;
blocking the client device from a computer network;
blocking the particular user from accessing the client device;
automatically installing security software on the client device to prevent the malicious computer application from executing;
or a combination thereof.

12. The one or more non-transitory computer-readable media of claim 10, wherein the method further comprises:
assigning a risk score to the particular user based on predicting the future variation in behavior.

13. The one or more non-transitory computer-readable media of claim 12, wherein the method further comprises:
prioritizing a plurality of risk scores based on a level of the potential security threat, wherein performing the remedial security action further comprises performing the remedial security action on a pre-determined number of client devices associated with users satisfying a pre-determined number of the prioritized risk scores.

14. The one or more non-transitory computer-readable media of claim 10, wherein creating the tensor model further comprises:
creating a three-dimensional tensor comprising a first dimension equal to a number of users of the plurality of users, a second dimension equal to a second pre-determined time step within the first pre-determined time period, and a third dimension equal to a number of operations performed by each of the number of users of the plurality of users.

15. The one or more non-transitory computer-readable media of claim 10, wherein establishing the first behavioral baseline further comprises:
obtaining behavioral data over the first pre-determined time period.

16. The one or more non-transitory computer-readable media of claim 10, wherein establishing the first behavioral baseline and the second behavioral baseline further comprises:
obtaining behavioral data over the first pre-determined time period.

17. The one or more non-transitory computer-readable media of claim 10, wherein establishing the first behavioral baseline and the second behavioral baseline further comprises:
determining a pattern of regular behavior.

18. The one or more non-transitory computer-readable media of claim 10, wherein determining the expected behavior further comprises:
determining that a second variation of behavior of the particular user is within a predetermined acceptable range.

19. A computing device for detecting abnormal behavior via temporally regularized tensor factorization, comprising:
a processor;
a memory in electronic communication with the processor; and instructions stored in the memory, the instructions being executable by the processor to:
- establish a first behavioral baseline corresponding to behavioral data of a plurality of users of cloud services;
- establish a second behavioral baseline corresponding to behavioral data for a particular user of the plurality of users;
- determine an expected behavior by determining a first variation of behavior between the second behavioral baseline and the first behavioral baseline;
- create a tensor model for a succession of pre-determined time periods using the behavioral data of the plurality of users, the tensor model comprising multiple three-dimensional tensors;
- determine a temporal dependence between the multiple three-dimensional tensors, the temporal dependence based on variation of behavior between the succession of pre-determined time periods from previously observed behavior;
- determine a temporal smoothness between the multiple three-dimensional tensors, the temporal smoothness based on behavioral drift in behavior between the succession of pre-determined time periods;
- predict a future variation in behavior of the particular user based on a combination of the temporal dependence, the temporal smoothness, and the expected behavior, where the future variation in behavior indicates a potential security threat; and
- perform a remedial security action on a client device associated with the particular user based on the predicted future variation in behavior.

20. The computing device of claim 19, wherein the instructions are further executable by the processor to:
- assign a risk score to the particular user based on predicting the future variation in behavior;
- prioritize a plurality of risk scores based on a level of the potential security threat; and
- perform the remedial security action on a pre-determined number of client devices associated with users satisfying a pre-determined number of the prioritized risk scores.

* * * * *